Patented Apr. 2, 1929.

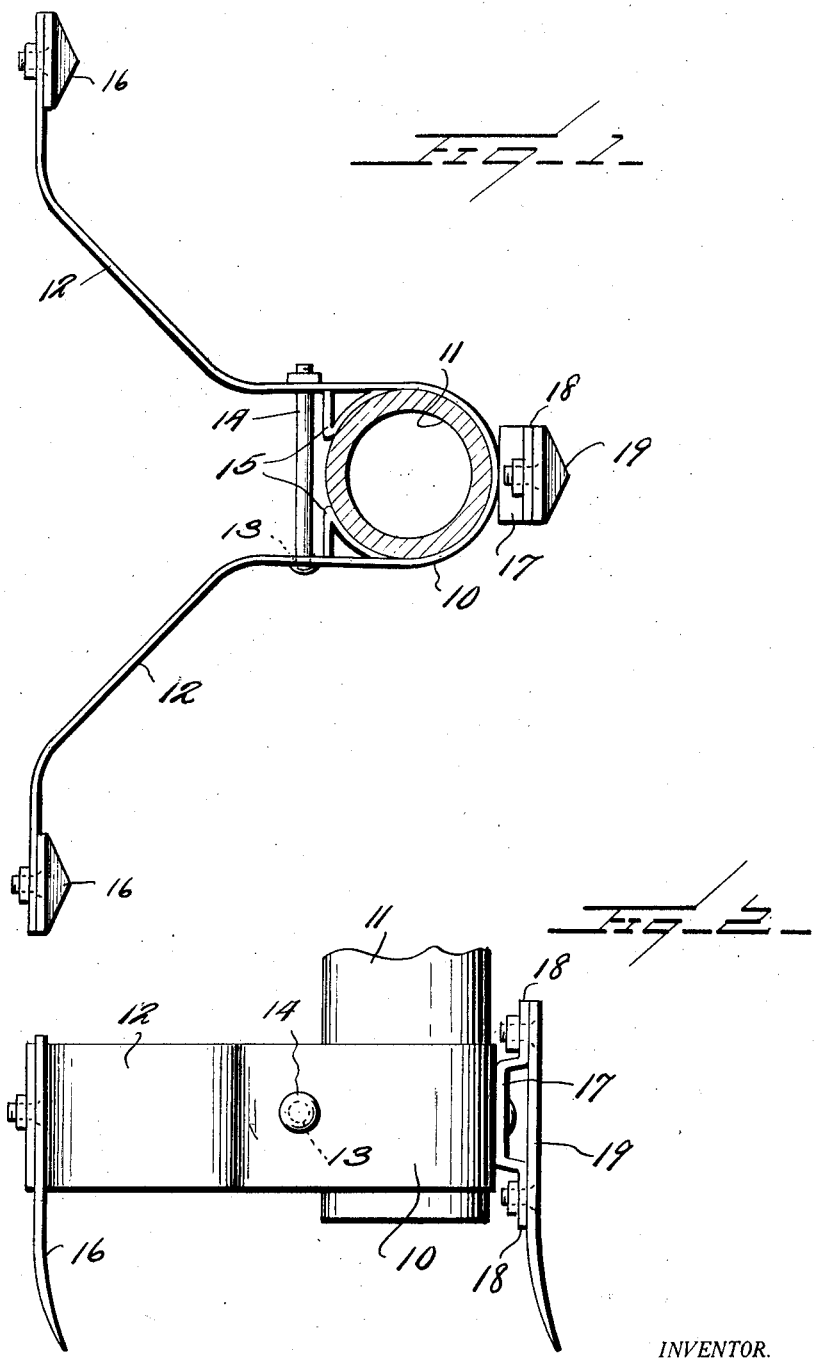

1,707,416

UNITED STATES PATENT OFFICE.

HOMER O. REMINGTON, OF MAUSTON, WISCONSIN.

ATTACHMENT FOR CULTIVATORS.

Application filed July 21, 1927. Serial No. 207,503.

This invention relates to cultivator attachments, and particularly to means for cultivating between corn rows or other crops which, during the early stages of growth, require frequent and careful tillage.

Cultivating between corn rows has heretofore been accomplished by the use of shovels or plows which tend to throw the earth to either or both sides and onto the corn, thus covering up the young and tender plants.

The general object of the present invention is to provide a cultivator attachment which may be applied to the shank of any ordinary cultivator as, for instance, a sulky cultivator and which is in the form of a clamp detachably engaging the shank, the clamp carrying three cultivator teeth or shovels in place of the ordinary cultivator teeth or the single shovel plow, which teeth will dig into and stir up the ground without, however, in any way affecting the young plants and without throwing any earth over onto these young plants, such an attachment permitting of faster working and of working closely to the plants without covering the same.

My invention is illustrated in the accompanying drawing, wherein:—

Figure 1 is a plan view of my attachment, the cultivator stock or standard being in section;

Figure 2 is a side elevation of the structure shown in Figure 1.

Referring to this drawing, it will be seen that the attachment consists of a clamping portion, designated 10, which is formed to embrace the shank 11 of a cultivator, such as a sulky cultivator, though I do not wish to be limited to this. This portion 10 has two rearwardly extending arms 12 which extend rearwardly and laterally to any desired extent, and these arms adjacent the portion 10 are perforated at 13 for the passage of a clamping bolt 14 which extends through the arms and by which the portion 10 may be clamped upon the shank 11. The body portion 10 has two inwardly extending prolongations 15 which may be attached to the body 10 or formed integral therewith and which clampingly engage the rear face of the cultivator shank.

Bolted to the extremities of the arms 12 are the plows or shovels 16 which may be of any suitable character but are shown as relatively small plows or teeth. Bolted to the front face of the portion 10 is an approximately U-shaped clip 17 having laterally directed end portions 18 and shovel 19 may be bolted to this clip or the clip may be turned vertically and a single shovel or plow point 19 may be bolted to this clip. The front shovel is disposed directly in front of the shank and the rear shovels 16 are disposed six inches rearward, one on each side, the outside of each rear shovel being five inches from a center line.

A clamp of the character disclosed will fit most cultivator shanks. The shovels or teeth are approximately one and one-half inch wide in actual use and the clamp portion 10 with its arms is approximately two inches in width. While I have illustrated a clamp which fits a cylindrical shank, I do not wish to be limited thereto as the clamp might be readily formed to fit a square shank. Each shovel is bolted to the clamp separately and can be readily replaced with new shovels when worn.

I do not wish to be limited to the exact details shown, as these might be modified in many ways without departing from the spirit of the invention as defined in the appended claims.

I claim:

1. An attachment for cultivators comprising a clamp having a body portion formed of a single strip of metal, the body portion being U-shaped in plan to embrace and fit upon a circular cultivator shank, the body portion then having laterally and rearwardly diverging arms, means disposed upon the inner faces of the U-shaped body portion opposite the bight thereof to engage against the cultivator shank, and a bolt connecting the U-shaped portion of said strip rearward of said means.

2. An attachment for cultivators comprising a clamp having a body portion formed of a single strip of metal, the body portion being U-shaped in plan to embrace and fit upon a circular cultivator shank, the body portion then having laterally and rearwardly diverging arms, means disposed upon the inner faces of the U-shaped body portion opposite the bight thereof to engage against the cultivator shank, a bolt connecting the U-shaped portion of said strip rearward of said means, a clip riveted to the front of the clamp body, a shovel detachably engaged with said clip, and shovels bolted to the ends of the laterally projecting arms.

In testimony whereof I hereunto affix my signature.

HOMER O. REMINGTON.